United States Patent
Ioffe et al.

(10) Patent No.: US 12,052,737 B2
(45) Date of Patent: Jul. 30, 2024

(54) WIRELESS NETWORKS WITH CAPABILITY-BASED COMMUNICATION SCHEDULING

(71) Applicant: Apple Inc., Cupertino, CA (US)

(72) Inventors: Anatoliy S. Ioffe, Sunnyvale, CA (US); Daniel Popp, Munich (DE); Fucheng Wang, Cupertino, CA (US); Camila Priale Olivares, Munich (DE); Alexander Sayenko, Munich (DE)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 17/569,609

(22) Filed: Jan. 6, 2022

(65) Prior Publication Data

US 2022/0225355 A1     Jul. 14, 2022

Related U.S. Application Data

(60) Provisional application No. 63/137,567, filed on Jan. 14, 2021.

(51) Int. Cl.
| | |
|---|---|
| *H04W 72/50* | (2023.01) |
| *H04W 52/36* | (2009.01) |
| *H04W 52/50* | (2009.01) |
| *H04W 72/1268* | (2023.01) |
| *H04W 72/20* | (2023.01) |
| *H04W 72/51* | (2023.01) |
| *H04W 52/14* | (2009.01) |

(52) U.S. Cl.
CPC ....... *H04W 72/535* (2023.01); *H04W 52/367* (2013.01); *H04W 52/50* (2013.01);
(Continued)

(58) Field of Classification Search
None
See application file for complete search history.

(56) References Cited

U.S. PATENT DOCUMENTS

| 10,980,035 B2 | 4/2021 | Ioffe et al. |
| 2008/0157894 A1 | 7/2008 | Hariton et al. |

(Continued)

FOREIGN PATENT DOCUMENTS

| CN | 101562470 A | 10/2009 |
| CN | 109892001 A | 6/2019 |

(Continued)

OTHER PUBLICATIONS

Study on supporting NR from 52.6 GHz to 71 GHz, 3GPP TSG RAN Meeting #86 RP-193259, Dec. 9-12, 2019, Intel Corporation.
(Continued)

*Primary Examiner* — Alex Skripnikov
(74) *Attorney, Agent, or Firm* — Treyz Law Group, P.C.; Michael H. Lyons

(57) ABSTRACT

An electronic device may communicate with a wireless base station using a 5G New Radio communications protocol. The base station may balance control timing and receiver performance for the devices in its cell by scheduling communications based on the communications capabilities of each device. This may ensure that the base station is able to provide communications with satisfactory control timing and receiver performance even if multiple different types of device are within its cell. In addition, the device may perform open loop transmit power control operations and then closed loop power control operations. To minimize complexity of the device, the device may only transmit at a maximum output power level during the open loop operations. If desired, the device may only transmit at the maximum output power level when the device is unable to decode a downlink reference signal transmitted by the base station within a predetermined number of symbols.

20 Claims, 7 Drawing Sheets

(52) U.S. Cl.
CPC ....... *H04W 72/1268* (2013.01); *H04W 72/20* (2023.01); *H04W 72/51* (2023.01); *H04W 52/146* (2013.01)

(56) References Cited

U.S. PATENT DOCUMENTS

| | | | |
|---|---|---|---|
| 2019/0260533 A1* | 8/2019 | Manolakos | H04B 7/0456 |
| 2020/0335869 A1* | 10/2020 | Jia | H01Q 9/0457 |
| 2020/0350970 A1* | 11/2020 | Liu | H04B 7/0628 |
| 2020/0367179 A1* | 11/2020 | Shan | H04W 24/10 |

FOREIGN PATENT DOCUMENTS

| | | |
|---|---|---|
| CN | 110381532 A | 10/2019 |
| CN | 111108795 A | 5/2020 |
| CN | 111225445 A | 6/2020 |
| CN | 111800844 A | 10/2020 |
| CN | 111903170 A | 11/2020 |

OTHER PUBLICATIONS

Extending current NR operation to 71GHz, 3GPP TSG RAN Meeting #86 RP-193229, Dec. 9-12, 2019, Qualcomm.

Study on NR beyond 52.6 GHz, 3GPP TSG RAN Meeting #81 RP-182066, Sep. 10-13, 2018, Intel Corporation.

3rd Generation Partnership Project; Technical Specification Group Radio Access Network; Study on requirements for NR beyond 52.6 GHZ (Release 16), 3GPP TR 38.807, Dec. 2019, vol. 16, 3GPP, Valbonne, France.

3rd Generation Partnership Project; Technical Specification Group Radio Access Network; NR; Physical channels and modulation (Release 16), 3GPP TS 38.211, Dec. 2019, vol. 16, 3GPP, Valbonne, France.

* cited by examiner

WIRELESS NETWORKS WITH CAPABILITY-BASED COMMUNICATION SCHEDULING This application claims the benefit of U.S. Provisional Patent Application No. 63/137,567, filed Jan. 14, 2021, which is hereby incorporated by reference herein in its entirety.

FIELD

This disclosure relates generally to wireless networks and, more particularly, to wireless networks having electronic devices with wireless communications circuitry.

BACKGROUND

Electronic devices often include wireless communications circuitry. For example, cellular telephones, computers, and other devices often contain antennas and wireless transceivers for supporting wireless communications. The electronic devices communicate with wireless base stations in a wireless network.

Each wireless base station operates within a corresponding cell. It can be difficult to provide satisfactory wireless communications when electronic devices having different capabilities attempt to communicate with the wireless network using the wireless base station.

SUMMARY

An electronic device may be provided with wireless circuitry and control circuitry. The wireless circuitry may communicate with a wireless base station using a 5G New Radio (NR) communications protocol. The wireless circuitry and the base station may convey radio-frequency signals using the Frequency Range 2 (FR2) frequency range of the 5G NR communications protocol, for example.

In OFDM networks with wide subcarrier spacing (SCS), symbol timing becomes a challenge for radio-frequency (RF) control of transmitted power. Consider an example in which the base station operates within a cell having multiple devices. The different devices within the cell may each have different respective communications capabilities (e.g., radio-frequency control timing requirements). As examples, different devices may have different transition times between transmitting and receiving or receiving and transmitting signals, different devices may have different transient periods for power changes and bandwidth changes between uplink symbols, different devices may have different processing delays during closed loop power control, etc.

The base station may balance RF control timing and receiver performance for each of the user equipment devices in its cell by scheduling communications with each device based on the communications capabilities of the device. This may ensure that base station is able to provide wireless communications capabilities having satisfactory RF control timing and receiver performance even if multiple different types of user equipment device are located within its cell. In addition, the device may perform open loop transmit power control (OL TPC) operations and then closed loop transmit power control (CL TPC) operations. To minimize complexity of the device, the device may only transmit at a maximum output power level during the OL TPC operations. If desired, the device may only transmit at the maximum output power level when the device is unable to decode a downlink reference signal transmitted by the base station within a predetermined number of symbols.

An aspect of the disclosure provides a method of operating a wireless base station within a cell. The method can include receiving wireless signals from a user equipment device in the cell. The method can include selecting a number of gap symbols exhibiting a collective duration that is greater than or equal to an uplink transient period of the user equipment device as identified by the wireless signals. The method can include generating a communication schedule for the user equipment device, where the communication schedule includes a first uplink symbol separated in time from a second uplink symbol by the selected number of gap symbols. The second uplink symbol can be subsequent to the first uplink symbol. The method can include performing wireless communications with the user equipment device at a frequency greater than 10 GHz in accordance with the communication schedule.

An aspect of the disclosure provides a method of operating an electronic device to communicate with a wireless base station. The method can include receiving a random access response (RAR) from the wireless base station that allocates uplink resources for the electronic device. The method can include transmitting wireless data to the wireless base station using the allocated uplink resources, where the wireless data identifies an uplink transient period of the electronic device. The method can include transmitting a first uplink symbol to the wireless base station at a first output power level. The method can include transmitting a second uplink symbol to the wireless base station at a second output power level that is different from the first output power level, where the second uplink symbol is separated in time from the first uplink symbol by a series of gap symbols exhibiting a collective duration that is greater than or equal to the uplink transient period of the electronic device.

An aspect of the disclosure provides a method of operating a wireless base station within a cell. The method can include receiving wireless signals from a user equipment device in the cell. The method can include identifying a closed loop transmit power control (TPC) processing time of the user equipment device using the received wireless signals. The method can include generating a communication schedule for the user equipment device, where the communication schedule includes a delay time that accommodates the identified closed loop TPC processing time of the user equipment device. The method can include performing wireless communications with the user equipment device at a frequency greater than 10 GHz in accordance with the communication schedule.

An aspect of the disclosure provides a method of operating an electronic device to communicate with a wireless base station. The method can include receiving a random access response (RAR) from the wireless base station that allocates uplink resources for the electronic device. The method can include transmitting wireless data to the wireless base station using the allocated uplink resources, where the wireless data identifies a closed loop transmit power control (TPC) processing time of the electronic device. The method can include performing wireless communications with the wireless base station at a frequency greater than 10 GHz in accordance with a communication schedule that includes a delay time that accommodates the closed loop TPC processing time of the electronic device.

An aspect of the disclosure provides a method of operating an electronic device to communicate with a wireless base station. The method can include transmitting a physical random access channel (PRACH) preamble to the wireless base station at a maximum output power level of the electronic device. The method can include performing a closed loop output power level adjustment with the wireless base station subsequent to transmission of the PRACH preamble and in accordance with a communication schedule that includes a delay time to accommodate a closed loop transmit power control (CL TPC) processing time of the electronic device.

An aspect of the disclosure provides a method of operating a wireless base station within a cell. The method can include controlling a user equipment device in the cell to transmit a physical random access channel (PRACH) preamble at a maximum output power level of the user equipment device. The method can include generating a communication schedule for the user equipment device that includes a delay time to accommodate a closed loop transmit power control (CL TPC) processing time of the electronic device. The method can include performing a closed loop output power level adjustment on the user equipment device in accordance with the communication schedule subsequent to transmission of the PRACH preamble by the user equipment device.

DETAILED DESCRIPTION

Figure 1:
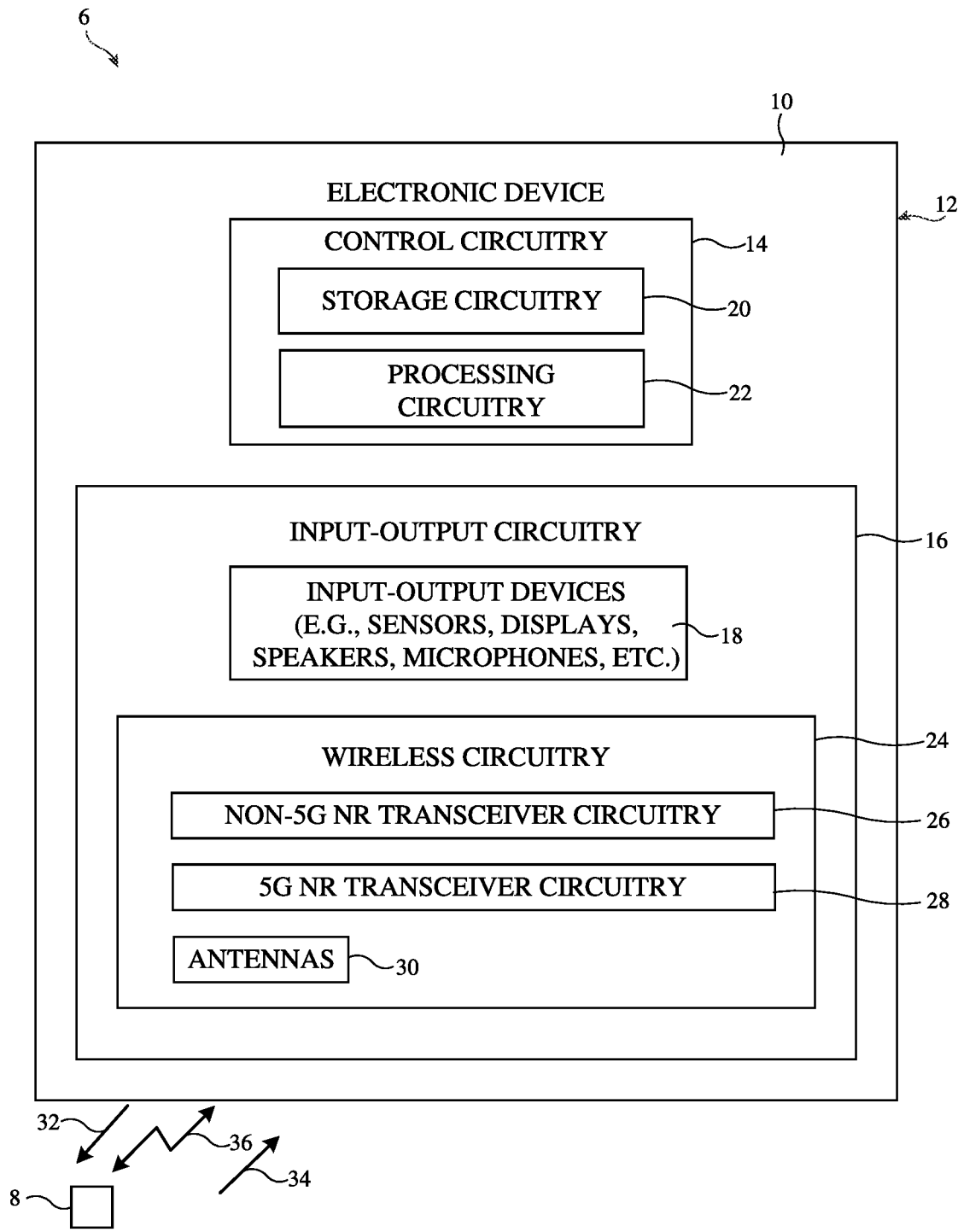
FIG. 1 is a functional block diagram of an illustrative electronic device having wireless circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 20 may include storage that is integrated within device 10 and/or removable storage media.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices 18 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 18 may be peripherals that are coupled to a main processing unit or other portion of device 10 via a wired or wireless link).

Input-output circuitry 16 may include wireless circuitry 24 to support wireless communications. Wireless circuitry 24 (sometimes referred to herein as wireless communications circuitry 24) may include one or more antennas 30. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 30. While control circuitry 14 is shown separately from wireless circuitry 24 in the example of FIG. 1 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Radio-frequency signals may be conveyed by wireless circuitry 24 using 5G New Radio (5G NR) communications bands or any other desired communications bands (sometimes referred to herein as frequency bands or simply as bands). The radio-frequency signals may include millimeter wave signals, sometimes referred to as extremely high frequency (EHF) signals, which propagate at frequencies above about 30 GHz (e.g., at 60 GHz or other frequencies between about 30 GHz and 300 GHz). The radio-frequency signals may also additionally or alternatively include centimeter wave signals, which propagate at frequencies between about 10 GHz and 30 GHz. The radio-frequency signals may additionally or alternatively include signals at frequencies less than 10 GHz, such as signals between about 410 MHz and 7125 MHz. In scenarios where the radio-frequency signals are conveyed using 5G NR communications bands, the radio-frequency signals may be conveyed in 5G NR communications bands within 5G NR Frequency Range 2 (FR2), which includes centimeter and millimeter wave frequencies between about 24 GHz and 100 GHz, and/or 5G NR communications bands within 5G NR Frequency Range 1 (FR1), which includes frequencies below 7125 MHz. If desired, device 10 may also contain antennas for handling satellite navigation system signals, cellular telephone signals (e.g., radio-frequency signals conveyed using long term evolution (LTE) communications bands or other non-5G NR communications bands), wireless local area network signals, near-field communications, light-based wireless communications, or other wireless communications.

For example, as shown in FIG. 1, wireless circuitry 24 may include radio-frequency transceiver circuitry that is used in conveying radio-frequency signals using the 5G NR communications protocol and RAT such as 5G NR transceiver circuitry 28. 5G NR transceiver circuitry 28 may support communications at frequencies between about 24 GHz and 100 GHz (e.g., within FR2) and/or at frequencies between about 410 MHz and 7125 MHz (e.g., within FR1). Examples of frequency bands that may be covered by 5G NR transceiver circuitry 28 include communications bands under the family of 3GPP wireless communications standards, communications bands under the IEEE 802.XX family of standards, an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, and/or other frequency bands between approximately 10 GHz and 110 GHz, a C-band between about 3300 MHz and 5000 MHz, an S-band between about 2300 MHz and 2400 MHz, an L-band between about 1432 MHz and 1517 MHz, and/or other frequency bands between approximately 410 MHz and 7125 MHz. 5G NR transceiver circuitry 28 may be formed from one or more integrated circuits (e.g., multiple integrated circuits mounted on a common printed circuit in a system-in-package device, one or more integrated circuits mounted on different substrates, etc.). Wireless circuitry 24 may cover different frequency bands that are used in different geographic regions if desired.

Wireless communications using 5G NR transceiver circuitry 28 may be bidirectional. For example, 5G NR transceiver circuitry 28 may convey radio-frequency signals 36 to and from external wireless equipment such as external equipment 8. External equipment 8 may be another electronic device such as electronic device 10, may be a wireless access point, may be a wireless base station, etc. Arrangements in which external equipment 8 is a wireless base station are sometimes described herein as an example. External equipment 8 may therefore sometimes be referred to herein as wireless base station 8 or simply as base station 8.

Device 10 and base station 8 may form part (e.g., nodes and/or terminals) of a wireless communications network such as communications network 6. Communications network 6 (sometimes referred to herein as network 6) may include any desired number of devices 10, base stations 8, and/or other network components arranged in any desired network configuration. Network 6 may be managed by a wireless network service provider. Device 10 may also sometimes be referred to herein as user equipment (UE) 10 (e.g., because device 10 may be used by an end user to perform wireless communications with the network). Base station 8 may operate within a corresponding cell that spans a particular geographic location or region. Base station 8 may be used to provide communications capabilities for multiple user equipment devices such as device 10 that are located within its cell.

Radio-frequency signals 36 (sometimes referred to herein as wireless link 36) may include radio-frequency signals transmitted by device 10 to base station 8 (e.g., in uplink direction 32) and radio-frequency signals transmitted by base station 8 to device 10 (e.g., in downlink direction 34). The radio-frequency signals 36 conveyed in uplink direction 32 may sometimes be referred to herein as uplink (UL) signals. The radio-frequency signals in downlink direction 34 may sometimes be referred to herein as downlink (DL) signals. Radio-frequency signals 36 may be used to convey wireless data. The wireless data may include a stream of data arranged into data packets, symbols, frames, etc. The wireless data may be organized/formatted according to the communications protocol governing the wireless link between device 10 and base station 8 (e.g., a 5G NR communications protocol). Wireless data conveyed by the uplink signals transmitted by device 10 (e.g., in uplink direction 32) may sometimes be referred to herein as uplink data. Wireless data conveyed by the downlink signals transmitted by base station 8 in (e.g., in downlink direction 34) may sometimes be referred to herein as downlink data. The wireless data may, for example, include data that has been encoded into corresponding data packets such as wireless data associated with a telephone call, streaming media content, internet browsing, wireless data associated with software applications running on device 10, email messages, etc. Control signals may also be conveyed in the uplink and/or downlink direction between base station 8 and device 10.

If desired, wireless circuitry 24 may also include transceiver circuitry for handling communications in non-5G NR communications bands such as non-5G NR transceiver circuitry 26. Non-5G NR transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz (e.g., cellular telephone signals conveyed using a 4G LTE protocol, a 3G protocol, or other non-5G NR protocols), GPS receiver circuitry that receives GPS signals at 1575 MHz or signals for handling other satellite positioning data (e.g., GLONASS signals at 1609 MHz, BeiDou Navigation Satellite System (BDS) band signals, etc.), television receiver circuitry, AM/FM radio receiver circuitry, paging system transceiver circuitry, near field communications (NFC) circuitry, ultra-wideband (UWB) transceiver circuitry that operates under the IEEE 802.15.4 protocol and/or other ultra-wideband communications protocols, etc. Non-5G NR transceiver circuitry 26 and 5G NR transceiver circuitry 28 may each include one or more integrated circuits, power amplifier circuitry, low-noise input amplifiers, passive radio-frequency components, switching circuitry, transmission line structures, and other circuitry for handling radio-frequency signals. Non-5G NR transceiver circuitry 26 may transmit and receive radio-frequency signals below 10 GHz (and organized according to a non-5G NR communications protocol) using one or more antennas 30. 5G NR transceiver circuitry 28 may transmit and receive radio-frequency signals (e.g., at FR1 and/or FR2 frequencies including frequencies above 10 GHz) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. 5G NR transceiver circuitry 28 may convey radio-frequency signals over short distances that travel over a line-of-sight path. To enhance signal reception for 5G NR communications, and particularly for communications at frequencies greater than 10 GHz, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming non-5G NR wireless links for non-5G NR transceiver circuitry 26 and another type of antenna may be used in conveying radio-frequency signals in 5G NR communications bands for 5G NR transceiver circuitry 28. If desired, antennas 30 that are used to convey radio-frequency signals for 5G NR transceiver circuitry 28 may be arranged in one or more phased antenna arrays.

There is a growing demand for wireless networks to handle communications at relatively high FR2 frequencies such as frequencies between about 52.6 GHz and 71 GHz. Communications at these frequencies are particularly attractive because the frequencies support relatively high data rates. In addition, a relatively large amount of this spectrum is unlicensed or available for communications across many different geographic regions on Earth.

Communications at these frequencies under a 5G NR communications protocol (e.g., a 3GPP communications standard) are characterized by a corresponding numerology. Base station 8 uses one or more of the numerologies to communicate with the user equipment devices (e.g., devices such as device 10) within its cell. Each numerology is labeled by a respective integer $\mu$ and defines the symbol timing of communications between base station 8 and device 10, which also has a direct impact on the radio-frequency (RF) control timing requirements in 5G NR transceiver circuitry 28.

Each numerology $\mu$ therefore has a corresponding subcarrier spacing (SCS), slot length, and symbol length (e.g., communications under each numerology are performed using the corresponding SCS, slot length, and symbol length). For example, wireless data conveyed between base station 8 and device 10 may be organized in time into a series of frames (e.g., according to the 5G NR communications protocol). Each frame includes a series of subframes. Each subframe includes a series of slots. Each slot may include a series of symbols (e.g., OFDM symbols). The number of symbols in each slot is constant across numerologies but varies depending on whether or not a cyclic prefix (CP) or extended CP is used.

The number of slots per subframe depends on the SCS and thus the numerology µ that is used. Similarly, the slot length and symbol length depend on the SCS and thus the numerology p, that is used. The SCS used to communicate between device 10 and base station 8 is defined by the formula SCS=$2^{\mu}$*(15 kHz). As examples, for the numerology µ=0, communications are performed using a SCS of 15 kHz, a slot length of 1 ms, and a symbol length of 71.3542 µs (assuming a regular non-extended CP is used). For the numerology µ=1, communications are performed using a SCS of 30 kHz, a slot length of 0.5 ms, and a symbol length of 35.6771 µs (assuming a regular non-extended CP is used). For the numerology µ=2, communications are performed using a SCS of 60 kHz, a slot length of 0.25 ms, and a symbol length of 17.8385 µs (assuming a regular non-extended CP is used). For the numerology µ=3, communications are performed using a SCS of 120 kHz, a slot length of 0.125 ms, and a symbol length of 8.9193 µs (assuming a regular non-extended CP is used). For the numerology µ=4, communications are performed using a SCS of 240 kHz, a slot length of 0.0625 ms, and a symbol length of 4.4596 µs (assuming a regular non-extended CP is used). For the numerology µ=5, communications are performed using a SCS of 480 kHz, a slot length of 0.03125 ms, and a symbol length of 2.2298 µs (assuming a regular non-extended CP is used). For the numerology µ=6, communications are performed using a SCS of 960 kHz, a slot length of 0.015625 ms, and a symbol length of 1.1149 µs (assuming a regular non-extended CP is used). Higher order numerologies may also be used if desired.

In general, numerology µ is a network design parameter for network 6. If desired, a first numerology (e.g., —=3) may be used for synchronization/control whereas a second numerology is used to exchange wireless data between device 10 and base station 8 (e.g., µ>3). In other embodiments, the same numerology may be used for both synchronization/control and wireless data exchange. The choice of numerology used for communications between base station 8 and device 10 has a direct impact on the RF control timing requirements of 5G NR transceiver circuitry 28. At the same time, increasing SCS (e.g., when higher-order numerologies are used) tends to improve receiver phase noise performance in 5G NR transceiver circuitry 28, leading to increased receiver sensitivity. In scheduling communications with device 10, base station 8 may tradeoff between RF control timing and receiver performance.

In OFDM networks with a wide SCS (e.g., an SCS>120 kHz), symbol timing becomes a challenge for RF control of transmitted power. Consider an example in which base station 8 operates within a cell having multiple user equipment devices such as device 10. The different user equipment devices within the cell may each have different respective communications capabilities (e.g., radio-frequency control timing requirements). For example, different user equipment devices may have different transition times between transmitting and receiving or receiving and transmitting signals, different user equipment devices may have different transient periods for power changes and bandwidth changes between uplink symbols, different user equipment devices may have different processing delays during closed loop power control, etc.

In some embodiments that are described herein as an example, base station 8 may balance RF control timing and receiver performance for each of the user equipment devices in its cell by scheduling communications with each user equipment device based on the communications capabilities of the user equipment device (e.g., device 10). This may ensure that base station 8 is able to provide wireless communications capabilities having satisfactory RF control timing and receiver performance even if multiple different types of user equipment device are located within its cell.

Figure 2:
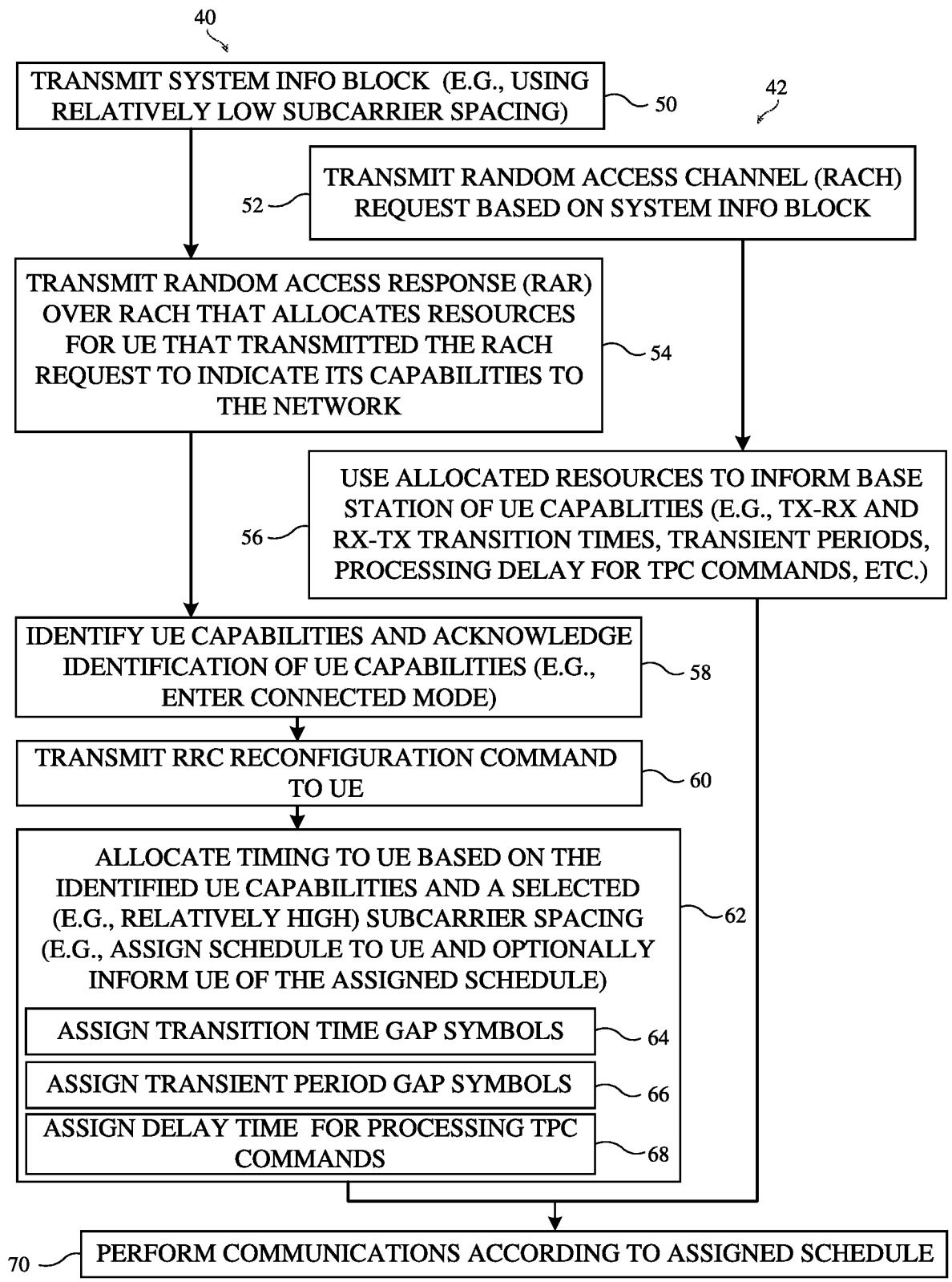
FIG. 2 is a flow chart of illustrative operations that may be performed by a wireless network having a base station that schedules communications for an electronic device based on the communications capabilities of the electronic device in accordance with some embodiments.

FIG. 2 is a flow chart of illustrative operations that may be performed by network 6 in scheduling communications between base station 8 and device 10 based on the communications capabilities of device 10. Operations 40 of FIG. 2 (e.g., operations 50, 54, 58, 60, 62, and 70) may be performed by base station 8 whereas operations 42 (e.g., operations 52, 56, and 70) may be performed by device 10.

At operation 50 (e.g., during an initial access operation), base station 8 may transmit a system information block to all user equipment devices in its cell. Base station 8 may transmit the system information block using a relatively low subcarrier spacing. As an example, base station 8 may transmit the system information block using an SCS of 120 kHz (e.g., using numerology µ=3). Base station 8 may continue to use this relatively low subcarrier spacing during the remainder of the initial access operation (e.g., for transmission of synchronization signal blocks (SSBs) and/or for performing other initial access-related operations).

At operation 52, device 10 may receive the system information block from base station 8. Device 10 may generate a random access channel (RACH) request based on the system information block received from base station 8. The RACH may be a physical random access channel (PRACH) and the RACH request may be a PRACH request. Device 10 may, for example, select a RACH channel for the RACH request as identified in the system information block received from base station 8. Device 10 may transmit the RACH request to base station 8 over the selected RACH channel. Any of the user equipment devices in the cell of base station 8 may respond to the system information block with a corresponding RACH request.

At operation 54, base station 8 may receive the RACH request transmitted by device 10. Base station 8 may generate a random access response (RAR) based on the RACH request received from device 10. Base station 8 may transmit the RAR to device 10 (e.g., over the RACH channel). The RAR may allocate (schedule) resources to the particular device 10 that transmitted the RACH request for subsequent communications (e.g., the RAR may be specific to a single user equipment device present within the cell of base station 8 such as device 10). The allocated resources may be uplink resources (e.g., an UL grant) that allow device 10 to inform base station 8 of one or more of the communications capabilities of device 10.

At operation 56, device 10 may receive the RAR from base station 8. In response to receipt of the RAR, device 10 may inform base station 8 of its communications capabilities. For example, device 10 may transmit one or more data packets that include information identifying the communications capabilities of device 10 to base station 8 using the allocated uplink resources. Because these uplink resources have been specifically allocated to device 10, no other user equipment devices in the cell will respond to the RAR transmitted by base station 8.

Different user equipment devices in the cell of base station 8 will typically exhibit different communications capabilities (e.g., as determined by the particular hardware, software, and/or manufacturer of each user equipment device). The communications capabilities may be any information identifying the communications capabilities, functions, capacity, and/or operations of device 10. The communications capabilities may, for example, include radio-frequency control timing requirements (e.g., time periods required for the radio-frequency circuitry in device 10 to adapt to various changes in transmitted/received data and/or output power level). In some embodiments that are described herein as examples, the radio-frequency control timing requirements may include a transmit-to-receive (TX-RX) transition time (e.g., the time required for the radio-frequency circuitry in device 10 to transition from transmitting uplink signals to receiving downlink symbols), a receive-to-transmit (RX-TX) transition time (e.g., the time required for the radio-frequency circuitry in device 10 to transition from receiving downlink signals to transmitting uplink symbols), a transient period (e.g., the time required for the radio-frequency circuitry in device 10 to adapt to changes in output power level and/or bandwidth between transmitted uplink symbols), and/or a processing delay for TPC commands (e.g., the time required for the radio-frequency circuitry in device 10 to perform one or more iterations of closed loop power control with base station 8). These examples are merely illustrative and, in general, any desired communications capabilities may be identified.

At operation 58, base station 8 may receive the information identifying the communications capabilities of device 10 from device 10. Base station 8 may identify the communications capabilities of device 10 from the received information.

At operation 60, base station 8 may transmit a radio resource control (RRC) reconfiguration command to device 10. The RRC reconfiguration command may configure device 10 to operate within the cell of base station 10 according to its communications capabilities (e.g., using a supported carrier aggregation mode, using the radio-frequency control timing requirements as previously identified by device 10, etc.). Once device 10 has acknowledged receipt of the RRC reconfiguration command to base station 8, base station 8 and device 10 may be considered to have entered a "connected mode."

At operation 62, base station 8 or other components of network 6 may allocate (schedule) timing for subsequent communications with device 10 based on the identified communications capabilities of device 10. Base station 8 may schedule the subsequent communications using a relatively high SCS (e.g., using a numerology greater than µ=3 and an SCS of 240 kHz or higher). Base station 8 may assign a timing schedule to device 10 that accommodates the identified radio-frequency control timing requirements of device 10.

For example, base station 8 may assign a selected number of transition time gap symbols for device 10 to use during TX-RX transition times and/or RX-TX transition times (at operation 64). The selected number of transition time gap symbols may, for example, be at least the minimum number of gap symbols that exhibit/span a duration that is at least as long as the RX-TX or TX-RX transition time (e.g., as identified by device 10 in informing base station 10 of its communications capabilities).

Additionally or alternatively, base station 8 may assign a selected number of transient period gap symbols for device 10 use between uplink symbol transmissions of different bandwidth and/or output power level (at operation 66). The selected number of transient period gap symbols may, for example, be at least the minimum number of gap symbols that exhibit/span a duration that is at least as long as the transient period (e.g., as identified by device 10 in informing base station 10 of its communications capabilities).

Additionally or alternatively, base station 8 may assign a delay time for device 10 to process transmit power control (TPC) commands (at operation 68). The delay time may accommodate any processing time required by the radio-frequency circuitry in device 10 to perform one or more iterations of closed loop power control with base station 8 (e.g., as identified by device 10 in informing base station 10 of its communications capabilities).

At operation 70, base station 8 and device 10 may perform wireless communications according to the allocated (assigned) schedule (e.g., using the timing as allocated during operation 70). Scheduling the timing for device 10 based on the communications capabilities of device 10 may minimize latency for device 10 while also allowing base station 8 to support concurrent communications with many different user equipment devices having different communications capabilities (e.g., having different radio-frequency control timing requirements). The example of FIG. 2 is merely illustrative. If desired, steps 58, 60, and/or 62 may be performed concurrently.

Figure 3A:
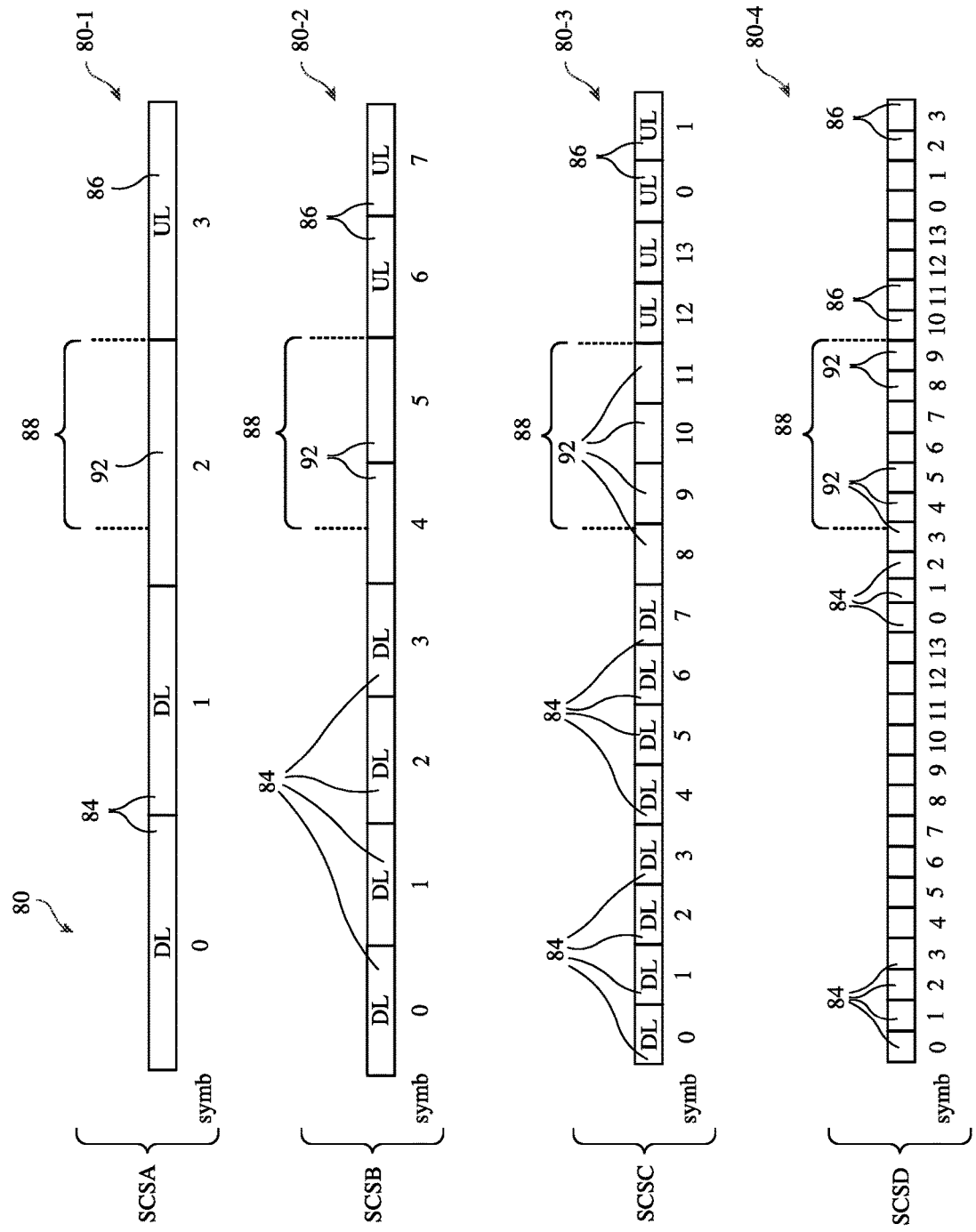
FIGS. 3A and 3B include timing diagrams showing how an illustrative base station may schedule a selected number of gap symbols during a transition time of an electronic device in accordance with some embodiments.
Figure 3B:
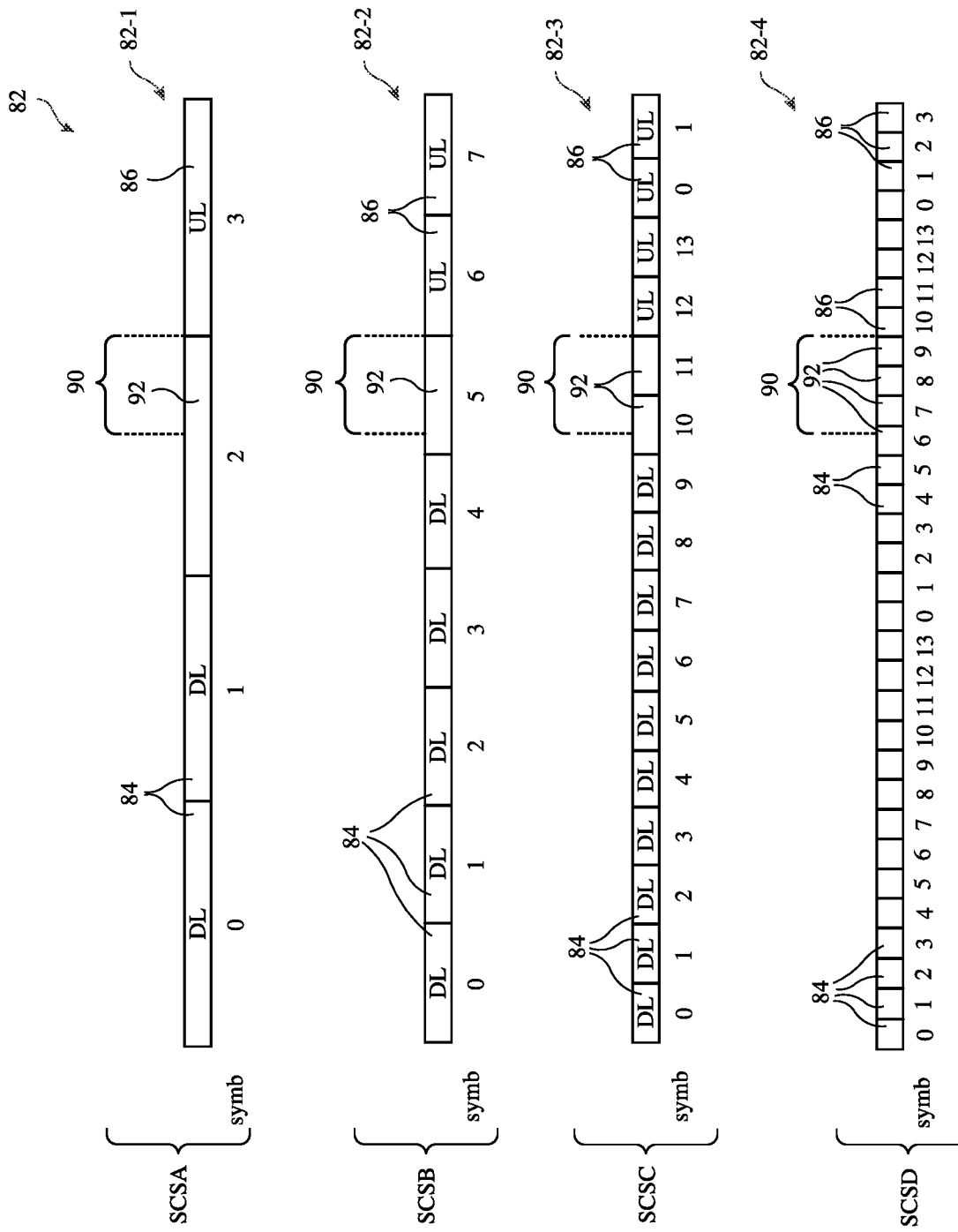

FIGS. 3A and 3B show timing diagrams illustrating how base station 8 may assign different numbers of transition time gap symbols to different user equipment devices having different communications capabilities (e.g., while performing operation 64 of FIG. 2). Timing diagrams 80 of FIG. 3A illustrate one example of how timing may be allocated for a first type of user equipment device (e.g., a given device 10 having a first RX-TX transition time 88). Timing diagrams 82 of FIG. 3B illustrate one example of how timing may be allocated for a second type of user equipment device (e.g., a given device 10 having a second RX-TX transition time 90 that is shorter than RX-TX transition time 88). Device 10 may inform base station 8 of whether device 10 exhibits RX-TX transition time 88 or RX-TX transition time 90 while performing operation 56 of FIG. 2.

Timing diagrams 80-1 and 82-1 illustrate an example where base station 8 uses a first subcarrier spacing SCSA (e.g., 120 kHz) in communicating with device 10. Timing diagrams 80-2 and 82-2 illustrate an example where base station 8 uses a second subcarrier spacing SCSB (e.g., 240 kHz) in communicating with device 10. Timing diagrams 80-3 and 82-3 illustrate an example where base station 8 uses a third subcarrier spacing SCSC (e.g., 480 kHz) in communicating with device 10. Timing diagrams 80-4 and 82-4 illustrate an example where base station 8 uses a fourth subcarrier spacing SCSD (e.g., 960 kHz) in communicating with device 10.

As shown by timing diagrams 80-1, 80-2, 80-3, 80-4, 82-1, 82-2, 82-3, and 82-4, higher subcarrier spacings may allow for the transmission of a greater number of symbols (symb) per unit time than lower subcarrier spacings. Each timing diagram includes a series of symbols numbered in cycling integers from 0. When communicating using the timing diagrams of FIGS. 3A and 3B, base station 8 transmits a series of one or more downlink (DL) symbols 84 to device 10. Device 10 is then scheduled to transmit a series of one or more uplink (UL) symbols 86 after receipt of the DL symbols 84. The device associated with timing diagrams 80 requires RX-TX transition time 88 to reconfigure its radio-frequency circuitry to switch from receiving DL symbols 84 to transmitting UL symbols 86. Similarly, the device associated with timing diagrams 82 requires RX-TX transition time 90 to reconfigure its radio-frequency circuitry to switch from receiving DL symbols 84 to transmitting UL symbols 86.

When device 10 informs base station 8 that it has an RX-TX transition time 88, base station 8 may allocate a series of one or more gap symbols 92 between the receipt of DL symbols 84 and the transmission of UL symbols 86. If desired, gap symbols 92 may be free of data payloads (e.g., without allocation to the particular user equipment device). Gap symbols 92 may, for example, be defined as symbols which are configured for UL in the cell-specific configuration, but which are left without allocation to the particular UE as a means of accommodating the transient period. The number of allocated gap symbols 92 may, for example, include at least enough gap symbols to accommodate RX-TX transition time 88 (e.g., the minimum number of gap symbols that exhibit a collective duration that is at least as long as RX-TX transition time 88 or greater). Similarly, when device 10 informs base station 8 that it has an RX-TX transition time 90, base station 8 may allocate one or more gap symbols 92 between the receipt of DL symbols 84 and the transmission of UL symbols 86. The number of allocated gap symbols 92 may, for example, include at least enough gap symbols to accommodate RX-TX transition time 90 (e.g., the minimum number of gap symbols that exhibit a collective duration that is at least as long as RX-TX transition time 90 or greater).

Because RX-TX transition time 90 is shorter than RX-TX transition time 88, base station 8 may allocate fewer gap symbols to devices 10 having RX-TX transition time 90 than to devices 10 having RX-TX transition time 88. This may serve to maximize the number of DL symbols 84 received prior to the RX-TX transition time relative to devices having longer RX-TX transition times. For example, when operating using subcarrier spacing SCSA, base station 8 may assign a single gap symbol 92 that is long enough to accommodate either RX-TX transition time 88 or RX-TX transition time 90. When operating using subcarrier spacing SCSB, base station 8 may assign two gap symbols 92 to accommodate RX-TX transition time 88 but may assign only a single gap symbol 92 to accommodate RX-TX transition time 90 (thereby allowing for receipt of one extra DL symbol 84 prior to the transition when device 10 exhibits RX-TX transition time 90). Similarly, when operating using subcarrier spacing SCSC, base station 8 may assign four gap symbols 92 to accommodate RX-TX transition time 88 but may assign only two gap symbols 92 to accommodate RX-TX transition time 90 (thereby allowing for receipt of two extra DL symbols 84 prior to the transition when device 10 exhibits RX-TX transition time 90). Finally, when operating using subcarrier spacing SCSD, base station 8 may assign seven gap symbols 92 to accommodate RX-TX transition time 88 but may assign only four gap symbols 92 to accommodate RX-TX transition time 90 (thereby allowing for receipt of three extra DL symbols 84 prior to the transition when device 10 exhibits RX-TX transition time 90).

In this way, base station 8 may schedule efficient communications using high subcarrier spacing for each user equipment device in its cell in accordance with its respective communications capabilities (e.g., in accordance with its RX-TX transition time). In other words, base station 8 may schedule different user equipment devices to use different numbers of gap symbols 92. The beginning of UL for all user equipment devices may be time-aligned for all user equipment devices in the cell. The network may also account for propagation delay differences across all user equipment devices in the cell with timing advance commands.

The example of FIGS. 3A and 3B is merely illustrative. In general, there may be any desired number of DL symbols 84 prior to RX-TX transition times 88 or 90 and there may be any desired number of UL symbols 86 after RX-TX transition times 88 or 90. Higher frequency SCS may be used if desired. Any desired number of gap symbols 92 may be scheduled between DL and UL symbols. In other implementations, the network may signal different cell-specific UL/DL symbol configurations for different devices with different communications capabilities as a part of the system information. While the example of FIGS. 3A and 3B illustrates different RX-TX transition times, the DL and UL symbols in FIGS. 3A and 3B may be swapped to show how base station 8 allocates different numbers of gap symbols for accommodating different TX-RX transition times.

Figure 4:
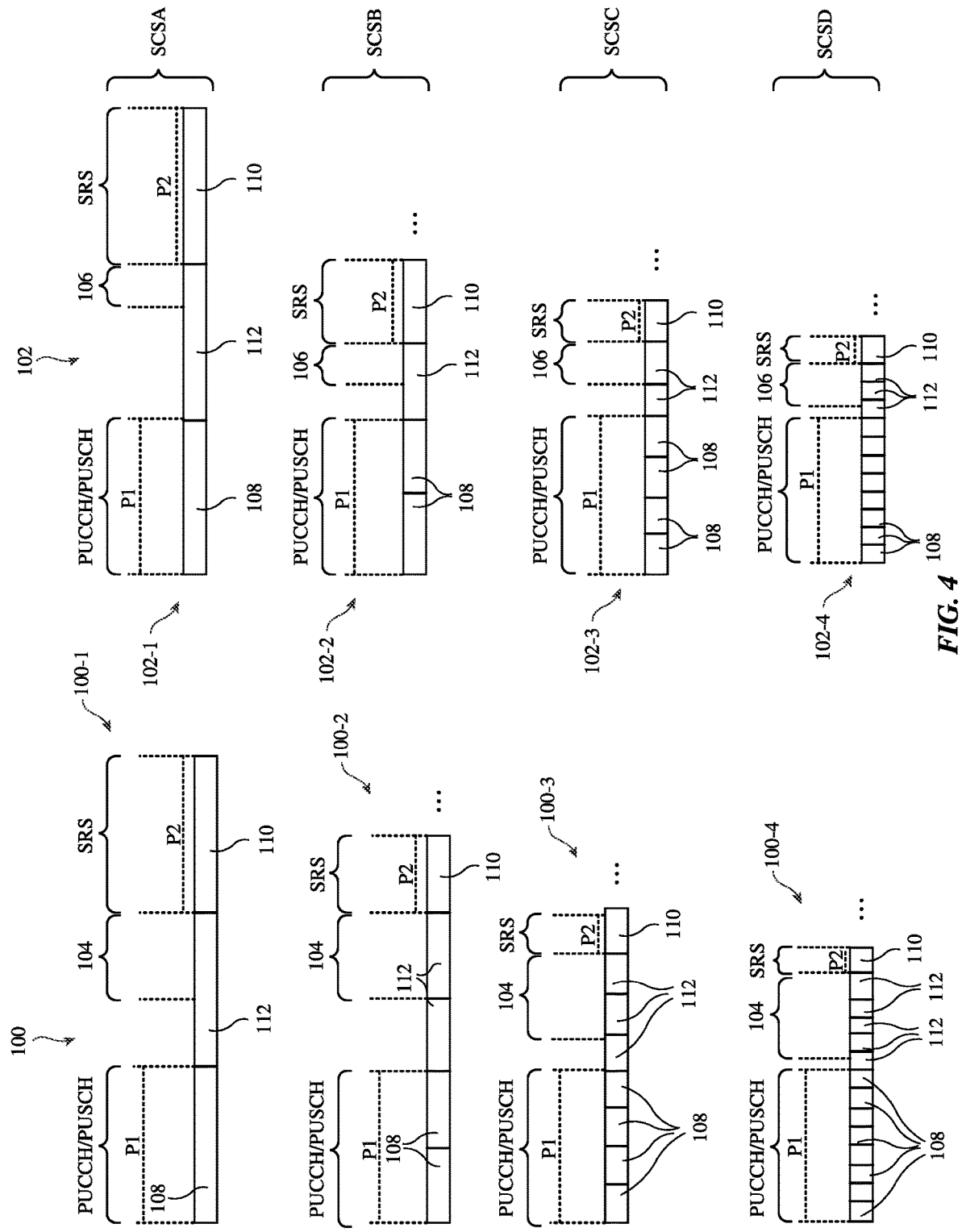
FIG. 4 includes timing diagrams showing how an illustrative base station may schedule a selected number of gap symbols during a transient period of an electronic device in accordance with some embodiments.

FIG. 4 shows timing diagrams illustrating how base station 8 may assign different numbers of (uplink) transient period gap symbols to different user equipment devices having different communications capabilities (e.g., while performing operation 66 of FIG. 2). As shown in FIG. 4, timing diagrams 100 illustrate one example of how timing may be allocated for a first type of user equipment device (e.g., a given device 10 having a first transient period 104). Timing diagrams 102 illustrate one example of how timing may be allocated for a second type of user equipment device (e.g., a given device 10 having a second transient period 106). Transient periods 104 and 106 may, for example, be the time period required by the radio-frequency circuitry on the user equipment device to accommodate changes in the output power level and/or bandwidth of transmitted UL signals. Device 10 may inform base station 8 of whether device 10 exhibits transient period 104 or transient period 106 while performing operation 56 of FIG. 2.

Timing diagrams 100-1 and 102-1 illustrate an example where base station 8 uses a first subcarrier spacing SCSA (e.g., 120 kHz) in communicating with device 10. Timing diagrams 100-2 and 102-2 illustrate an example where base station 8 uses a second subcarrier spacing SCSB (e.g., 240 kHz) in communicating with device 10. Timing diagrams 100-3 and 102-3 illustrate an example where base station 8 uses a third subcarrier spacing SCSC (e.g., 480 kHz) in communicating with device 10. Timing diagrams 100-4 and 102-4 illustrate an example where base station 8 uses a fourth subcarrier spacing SCSD (e.g., 960 kHz) in communicating with device 10.

As shown by timing diagrams 100-1, 100-2, 100-3, 100-4, 102-1, 102-2, 102-3, and 102-4, device 10 may initially transmit a series of one or more UL symbols 108. Uplink symbols 108 may, for example, be used to convey wireless data (information) over a physical uplink shared channel (PUSCH) or control data over a physical uplink control channel (PUCCH). When device 10 is scheduled to transmit a series of one or more subsequent uplink symbols 110 at a second output power level P2 that is different from output power level P1 and/or at a different bandwidth, transient periods 104 or 106 allow for the radio-frequency circuitry in device 10 to reconfigure itself for such a change in output power level or bandwidth. In one implementation that is described herein as an example, uplink symbols 110 may be sounding reference signal (SRS) symbols. This example is merely illustrative and, in general, uplink symbols 108 and 110 may be any desired uplink symbols having different output power level and/or bandwidth requirements.

The device associated with timing diagrams 100 requires transient period 104 to reconfigure its radio-frequency circuitry to switch from transmitting a series of one or more UL symbols 108 to transmitting UL symbols 110. Similarly, the device associated with timing diagrams 102 requires transient period 106 to reconfigure its radio-frequency circuitry to switch from transmitting UL symbols 108 to transmitting UL symbols 110. When device 10 informs base station 8 that it exhibits transient period 104, base station 8 may allocate a series of one or more gap symbols 112 between the transmission of UL symbols 108 and transmission of UL symbols 110. The number of allocated gap symbols 112 may, for example, include at least enough gap symbols to accommodate transient period 104 (e.g., the minimum number of gap symbols that exhibit a collective duration that lasts at least for transient period 104 or greater). Similarly, when device 10 informs base station 8 that it exhibits transient period 106, the number of allocated gap symbols 112 may include at least enough gap symbols to accommodate transient period 106 (e.g., the minimum number of gap symbols that exhibit a collective duration that lasts at least for transient period 106 or greater).

Because transient period 106 is shorter than transient period 104, base station 8 may allocate fewer gap symbols 112 to devices 10 having transient period 106 than to devices 10 having transient period 104. This may serve to minimize the amount of time required for device 10 to transmit a given number of uplink symbols to base station 8. For example, when operating using subcarrier spacing SCSA, base station 8 may assign a single gap symbol 112 that is long enough to accommodate either transient period 104 or transient period 106. When operating using subcarrier spacing SCSB, base station 8 may assign two gap symbols 112 to accommodate transient period 104 but may assign only a single gap symbol 112 to accommodate transient period 106 (thereby allowing for the same number of UL symbols to be transmitted one symbol faster than when transient period 104 is used). Similarly, when operating using subcarrier spacing SCSC, base station 8 may assign three gap symbols 112 to accommodate transient period 104 but may assign only two gap symbols 112 to accommodate transient period 106 (thereby allowing for the same number of UL symbols to be transmitted one symbol faster than when transient period 104 is used). Finally, when operating using subcarrier spacing SCSD, base station 8 may assign five gap symbols 112 to transient period 104 but may assign only three gap symbols 112 to transient period 106 (thereby allowing for the same number of UL symbols to be transmitted two symbols faster than when transient period 104 is used).

In this way, base station 8 may schedule efficient communications using high subcarrier spacing for each user equipment device in its cell in accordance with its communications capabilities (e.g., in accordance with its uplink signal transient period). In other words, base station 8 may schedule different user equipment devices to use different numbers of gap symbols 112 to accommodate different transient times for power and/or bandwidth changes between uplink symbols (e.g., as fixed values which are independent of numerology). Once device 10 enters connected mode (and informs the network about its transient period capabilities), the network can schedule symbols with power and/or bandwidth changes accordingly. If desired, gap symbols 112 may be free of data payloads (e.g., without allocation to the particular user equipment device).

The example of FIG. 4 is merely illustrative. In general, there may be any desired number of UL symbols 108 prior to transient periods 104 or 106 and there may be any desired number of UL symbols 110 after transient periods 104 or 106. Higher frequency subcarrier spacings may be used if desired. Any desired number of gap symbols 112 may be scheduled between UL symbols 108 and 110.

Figure 5:
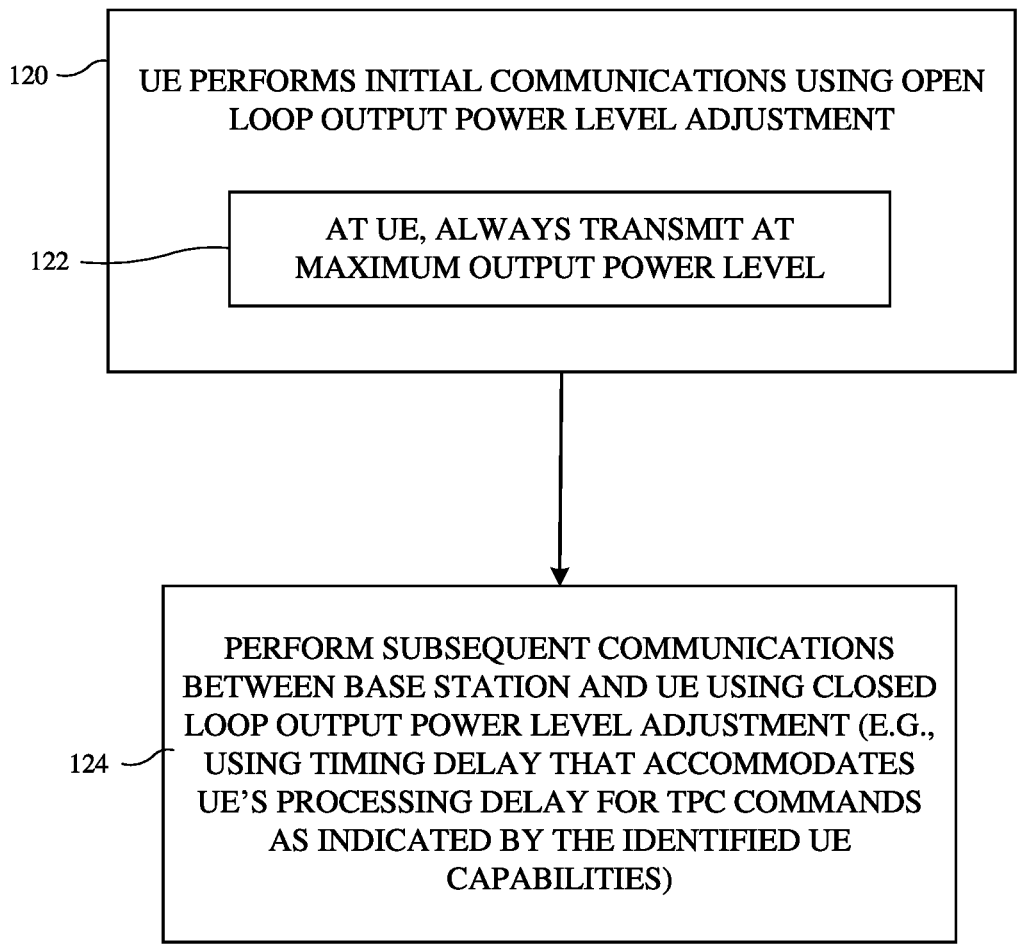
FIG. 5 is a flow chart of illustrative operations that may be performed by an illustrative electronic device to adjust output power level in communicating with a base station in accordance with some embodiments.

FIG. 5 is a flow chart of illustrative operations involved in assigning different delay times for TPC commands to user equipment devices in the cell of base station 8 (e.g., while performing operation 68 of FIG. 2). In general, device 10 and/or base station 8 may adjust the output power level used by device 10 in transmitting UL signals to base station 8. These adjustments to output power level may include open loop adjustments and/or closed loop adjustments.

At operation 120, device 10 may perform initial communications with base station 8 using open loop power level adjustments (e.g., using an open loop transmit power control (OL TPC) scheme). Device 10 may perform open loop power level adjustments by calculating the coupling loss between base station 8 and device 10 (e.g., by estimating the receive signal strength of a downlink reference signal) and by calculating the output power level of device 10 from the target power spectral density (PSD) at the receiver on base station 8 (which is configured by the network) and the calculated coupling loss, for example. The signal strength estimation error and configured output power tolerance both contribute to a large variation in the power delivered to base station 8 (e.g., by as much as +/−14 dB).

After open loop output power level adjustments have been performed, processing may proceed to operation 124. At operation 124, device 10 and base station 8 may perform subsequent communications using closed loop output power level adjustments (e.g., using a closed loop transmit power control (CL TPC) scheme). Base station 8 may send transmit TPC commands (e.g., TPC symbols) to device 10 to instruct device 10 to increase or decrease its output power level based on the measured power level of the signals as received at base station 8. The closed loop output power level adjustments may be performed iteratively (e.g., in one or more iterations) until a desired power level is reached. In practice, different user equipment devices may require different delay times to process and execute the TPC commands associated with closed loop output power level adjustment. This delay time may form part of the communications capabilities that are used by base station 8 in scheduling communications for device 10 (e.g., while performing operation 62 of FIG. 2). This delay time (processing delay for TPC commands) may, for example, be included in an "ON-ON transient period requirement" field. Base station 8 may schedule (allocate) different amounts of delay time for device 10 to process and execute closed loop TPC commands as required by the communications capabilities of the device. There may be a gap inserted between consecutive UL transmissions to allow the UE to apply power control to the next transmitted symbol.

In this way, base station 8 may schedule efficient communications using high subcarrier spacing for each user equipment device in its cell in accordance with its communications capabilities (e.g., in accordance with its delay time as required to process and execute closed loop TPC commands received from base station 8). In other words, base station 8 may schedule different user equipment devices in its cell to use different delay times for processing and executing closed loop TPC commands.

If desired, in order to reduce the complexity of the radio-frequency circuitry implemented on device 10, device 10 may always transmit at its maximum output power level during open loop power control (at operation 122). If desired, base station 8 may instruct device 10 to always transmit at its maximum output power level during open loop power control (e.g., during a PRACH process performed by device 10 and base station 8). For example, during open loop power control (e.g., initial communications) device 10 may transmit initial symbols (e.g., RACH symbols, a PRACH preamble, an initial set of PUCCH and/or PUSCH symbols, etc.) at maximum output power level (during operation 120) and the network may then proceed to adjust the output power level of device 10 using closed loop TPC commands according to a closed loop transmit power control (CL TPC) procedure (during operation 124).

Figure 6:
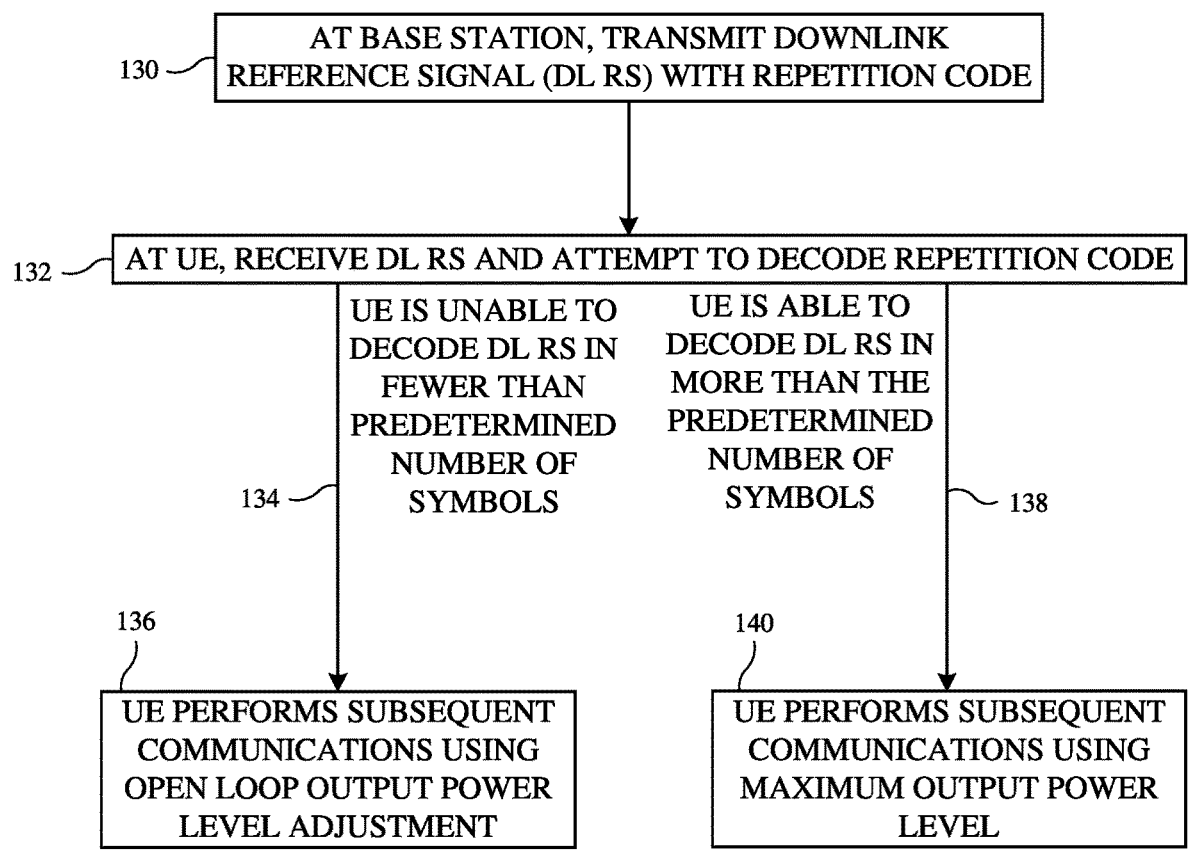
FIG. 6 is a flow chart of illustrative operations that may be performed by a wireless network in adjusting the output power level of an electronic device based on a downlink reference signal repetition code in accordance with some embodiments.

If desired, base station 8 may adjust the output power level of device 10 based on a downlink reference signal repetition code. FIG. 6 is a flow chart showing how base station 8 and device 10 may adjust the output power level of device 10 based on a downlink reference signal repetition code.

At operation 130, base station 8 may transmit a downlink reference signal (DL RS) with a repetition code. The DL RS may be defined as a sequence spanning a core number of symbols S with a repetition code N configured by the network, such that it is possible for a user equipment device to decode the DL RS in 1×S, 2×S, . . . , N×S symbols. Base station 8 may transmit the DL RS with a first set of symbols, where the repetition code is formed from a second set of symbols immediately following the first set of symbols and that are a copy of the first set of symbols. Base station 8 may transmit the repetition code immediately after transmitting the SSB to device 10 (e.g., the SSB may form the first set of symbols), during operation 40 of FIG. 2, periodically, or at any other desired time.

At operation 132, device 10 may receive the DL RS and may attempt to decode the DL RS. For example, if device 10 receives the first set of symbols in the DL RS correctly (e.g., if device 10 generates a correct cyclic redundancy check (CRC) from the first set of symbols), device 10 need not further process the second set of symbols (the repetition code). However, if device 10 does not receive the first set of symbols correctly, device 10 further processes the second set of symbols immediately subsequent to the first set of symbols (the repetition code) and coherently combines the first and second sets of symbols to correctly demodulate the first set of symbols.

If device 10 is able to decode the DL RS in fewer than a predetermined number of symbols (e.g., after just the first set of symbols in the DL RS), processing may proceed to operation 136 as shown by path 134. At operation 136, device 10 may perform subsequent communications using open loop output power level adjustment (e.g., processing may proceed to operation 120 of FIG. 5 without performing operation 122 of FIG. 5 before advancing to closed loop power control). However, if device 10 is only able to decode the DL RS after the predetermined number of symbols (e.g., after also processing the second set of symbols, the repetition code, or N>1 (e.g., 2×S, . . . , N×S) symbols), processing may proceed to operation 140 as shown by path 138. At operation 138, device 10 may perform subsequent communications only using the maximum output power level (e.g., processing may proceed to operation 122 of FIG. 5 before advancing to closed loop power control). In other words, rather than simply forcing transmissions during open loop power control to use the maximum output power level of device 10, the operations of FIG. 6 may be performed to determine whether operation 120 of FIG. 5 is performed with or without performing operation 122 of FIG. 5.

During a connected mode RRC session, the network can further periodically schedule DL RS or physical downlink shared channel (PDSCH) with repetition coding in this way, such that during the closed loop transmit power control (e.g., operation 124 of FIG. 5), an override can be defined where, if device 10 cannot decode the DL RS or repetition-coded PDSCH within a core set of symbols, then device 10 transmits using maximum power regardless of the current TPC state or TPC command.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 22 of FIG. 1, etc.). The processing circuitry may include microprocessors, central processing units (CPUs), application-specific integrated circuits with processing circuitry, or other processing circuitry.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a wireless base station within a cell, the method comprising: receiving wireless signals from a user equipment device in the cell; selecting a number of gap symbols exhibiting a collective duration that is greater than or equal to an uplink transient period of the user equipment device as identified by the wireless signals; generating a communication schedule for the user equipment device, the communication schedule including a first uplink symbol separated in time from a second uplink symbol by the selected number of gap symbols, the second uplink symbol being subsequent to the first uplink symbol; and performing wireless communications with the user equipment device at a frequency greater than 10 GHz in accordance with the communication schedule.

Example 2 includes the method of example 1 or some other example or combination of examples herein, wherein the uplink transient period is associated with a time required by radio-frequency circuitry on the user equipment device to be reconfigured to accommodate a change in output power level or bandwidth.

Example 3 includes the method of examples 1 or 2 or some other example or combination of examples herein, wherein the second uplink symbol is transmitted by the user equipment device with a different output power level than the first uplink symbol.

Example 4 includes the method of any one of examples 1-3 or some other example or combination of examples herein, wherein the first uplink symbol comprises a physical uplink shared channel (PUSCH) symbol.

Example 5 includes the method of any one of examples 1-4 or some other example or combination of examples herein, wherein the second uplink symbol comprises a sounding reference signal (SRS) symbol.

Example 6 includes the method of any one of examples 1-5 or some other example or combination of examples herein, wherein the first uplink symbol comprises a physical uplink control channel (PUCCH) symbol.

Example 7 includes the method of any one of examples 1-6 or some other example or combination of examples herein, wherein the second uplink symbol comprises a sounding reference signal (SRS) symbol.

Example 8 includes the method of any one of examples 1-7 or some other example or combination of examples herein, further comprising: receiving additional wireless signals from an additional user equipment device in the cell; selecting an additional number of gap symbols exhibiting a collective duration that is greater than or equal to an additional uplink transient period of the additional user equipment device as identified by the additional wireless signals, the additional number of gap symbols being different from the number of gap symbols; generating an additional communication schedule for the user equipment device, the additional communication schedule including a third uplink symbol separated in time from a fourth uplink symbol by the selected additional number of gap symbols, the fourth uplink symbol being subsequent to the third uplink symbol; and performing wireless communications with the additional user equipment device in accordance with the communication schedule.

Example 9 includes the method of any one of examples 1-8 or some other example or combination of examples herein, wherein performing wireless communications in accordance with the communication schedule comprises performing wireless communications using a subcarrier spacing that is greater than or equal to 240 kHz.

Example 10 includes a method of operating an electronic device to communicate with a wireless base station, the method comprising: receiving a random access response (RAR) from the wireless base station that allocates uplink resources for the electronic device; transmitting wireless data to the wireless base station using the allocated uplink resources, wherein the wireless data identifies an uplink transient period of the electronic device; transmitting a first uplink symbol to the wireless base station at a first output power level; and transmitting a second uplink symbol to the wireless base station at a second output power level that is different from the first output power level, wherein the second uplink symbol is separated in time from the first uplink symbol by a series of gap symbols exhibiting a collective duration that is greater than or equal to the uplink transient period of the electronic device.

Example 11 includes the method of example 10 or some other example or combination of examples herein, wherein the first uplink symbol comprises a physical uplink shared channel (PUSCH) symbol.

Example 12 includes the method of any one of examples 10, 11, or some other example or combination of examples herein, wherein the second uplink symbol comprises a sounding reference signal (SRS) symbol.

Example 13 includes the method of any one of examples 10-12 or some other example or combination of examples herein, wherein the first uplink symbol comprises a physical uplink control channel (PUCCH) symbol.

Example 14 includes the method of any one of examples 10-13 or some other example or combination of examples herein, wherein the second uplink symbol comprises a sounding reference signal (SRS) symbol.

Example 15 includes the method of any one of examples 10-14 or some other example or combination of examples herein, wherein transmitting the first and second uplink symbols comprises transmitting the first and second uplink symbols using a subcarrier spacing that is greater than or equal to 240 kHz.

Example 16 includes a method of operating an electronic device to communicate with a wireless base station, the method comprising: receiving a random access response (RAR) from the wireless base station that allocates uplink resources for the electronic device; transmitting information to the wireless base station using the allocated uplink resources, the information identifying a closed loop transmit power control (TPC) processing time of the electronic device; and performing wireless communications with the wireless base station at a frequency greater than 10 GHz in accordance with a communication schedule that includes a delay time that accommodates the closed loop TPC processing time of the electronic device.

Example 17 includes the method of example 16 some other example or combination of examples herein, wherein performing wireless communications with the wireless base station comprises performing wireless communications using a subcarrier spacing that is greater than or equal to 240 kHz.

Example 18 includes the method of example 16, 17, or some other example or combination of examples herein, wherein performing the wireless communications comprises: performing a closed loop output power level adjustment with the wireless base station based on the communication schedule and the closed loop TPC processing time.

Example 19 includes the method of examples 16-18 or some other example or combination of examples herein, further comprising: transmitting a physical random access channel (PRACH) preamble to the wireless base station at a maximum output power level prior to performing the closed loop output power level adjustment.

Example 20 includes the method of any one of examples 16-19 or some other example or combination of examples herein, further comprising: prior to transmitting the PRACH preamble at the maximum output power level, receiving a command from the wireless base station instructing the electronic device to transmit the PRACH preamble at the maximum output power level.

Example 21 may include an apparatus comprising means to perform one or more elements of a method described in or related to any of examples 1-20 or any combination thereof, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20 or any combination thereof, or any other method or process described herein.

Example 23 may include an apparatus comprising logic, modules, or circuitry to perform one or more elements of a method described in or related to any of examples 1-20 or any combination thereof, or any other method or process described herein.

Example 24 may include a method, technique, or process as described in or related to any of examples 1-20 or any combination thereof, or portions or parts thereof.

Example 25 may include an apparatus comprising: one or more processors and one or more non-transitory computer-readable storage media comprising instructions that, when executed by the one or more processors, cause the one or more processors to perform the method, techniques, or process as described in or related to any of examples 1-20, or any combination thereof, or portions thereof.

Example 26 may include a signal as described in or related to any of examples 1-20, or any combination thereof, or portions or parts thereof.

Example 27 may include a datagram, information element, packet, frame, segment, PDU, or message as described in or related to any of examples 1-20, or any combination thereof, or portions or parts thereof, or otherwise described in the present disclosure.

Example 28 may include a signal encoded with data as described in or related to any of examples 1-20, or any combination thereof, or portions or parts thereof, or otherwise described in the present disclosure.

Example 29 may include a signal encoded with a datagram, IE, packet, frame, segment, PDU, or message as described in or related to any of examples 1-20, or any combination thereof, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or any combination thereof, or portions thereof.

Example 31 may include a computer program comprising instructions, wherein execution of the program by a processing element is to cause the processing element to carry out the method, techniques, or process as described in or related to any of examples 1-20, or any combination thereof, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made by those skilled in the art without departing from the scope and spirit of the described embodiments. The foregoing embodiments may be implemented individually or in any combination.

What is claimed is:

1. A method of operating an electronic device to communicate with a wireless base station, the method comprising:
   receiving a random access response (RAR) from the wireless base station that allocates uplink resources for the electronic device;
   transmitting wireless data to the wireless base station using the allocated uplink resources, wherein the wireless data identifies a time period;
   transmitting a first uplink symbol to the wireless base station at a first output power level; and
   transmitting a second uplink symbol to the wireless base station at a second output power level that is different from the first output power level, wherein the second uplink symbol is separated in time from the first uplink symbol by a series of gap symbols exhibiting a collective duration that is greater than or equal to the time period identified by the wireless data transmitted to the wireless base station, the time period being longer than a duration of one of the gap symbols in the series of gap symbols.

2. The method of claim 1, wherein the first uplink symbol comprises a physical uplink shared channel (PUSCH) symbol.

3. The method of claim 2, wherein the second uplink symbol comprises a sounding reference signal (SRS) symbol.

4. The method of claim 1, wherein the first uplink symbol comprises a physical uplink control channel (PUCCH) symbol.

5. The method of claim 4, wherein the second uplink symbol comprises a sounding reference signal (SRS) symbol.

6. The method of claim 1, wherein transmitting the first and second uplink symbols comprises transmitting the first and second uplink symbols using a subcarrier spacing that is greater than or equal to 240 kHz.

7. The method of claim 1, wherein the time period identified by the wireless data comprises an uplink transient period of the electronic device.

8. The method of claim 7, further comprising:
   adjusting, during the uplink transient period, radio-frequency circuitry on the electronic device from transmission at the first output power level to transmission at the second output power level.

9. The method of claim 7, wherein the uplink transient period is associated with a time required by radio-frequency circuitry on the electronic device to be reconfigured to accommodate a change in output power level from the first output power level to the second output power level.

10. The method of claim 7, wherein the first uplink symbol comprises a physical uplink control channel (PUCCH) symbol or a physical uplink shared channel (PUSCH) symbol, the second uplink symbol comprises a sounding reference signal (SRS) symbol, and transmitting the first and second uplink symbols comprises transmitting the first and second uplink symbols using a subcarrier spacing that is greater than or equal to 240 kHz.

11. The method of claim 10, wherein the time period identified by the wireless data comprises a closed loop transmit power control (TPC) processing time of the electronic device.

12. The method of claim 11, wherein transmitting the second uplink symbol comprises transmitting the second uplink symbol using a subcarrier spacing that is greater than or equal to 240 kHz.

13. The method of claim 11, further comprising:
performing a closed loop output power level adjustment with the wireless base station based on a communication schedule and the closed loop TPC processing time.

14. The method of claim 13, further comprising:
transmitting a physical random access channel (PRACH) preamble to the wireless base station at a maximum output power level prior to performing the closed loop output power level adjustment.

15. The method of claim 14, further comprising:
prior to transmitting the PRACH preamble at the maximum output power level, receiving a command from the wireless base station instructing the electronic device to transmit the PRACH preamble at the maximum output power level.

16. An electronic device comprising:
one or more antennas configured to receive a random access response (RAR) from a wireless base station that allocates uplink resources for the electronic device; and
a transmitter communicably coupled to the one or more antennas, wherein the transmitter is configured to
transmit wireless data to the wireless base station using the allocated uplink resources, wherein the wireless data identifies an uplink transient time period of the electronic device,
transmit a first uplink symbol to the wireless base station at a first output power level, and
transmit a second uplink symbol to the wireless base station at a second output power level that is different from the first output power level, wherein the second uplink symbol is separated in time from the first uplink symbol by a series of gap symbols exhibiting a collective duration that is greater than or equal to the time period identified by the wireless data transmitted to the wireless base station, wherein the uplink transient period is longer than a duration of one of the gap symbols in the series of gap symbols.

17. The electronic device of claim 16, wherein the transmitter is configured to transmit the first and second uplink symbols using a 5G New Radio (NR) Frequency Range 2 (FR2) communication protocol.

18. The electronic device of claim 16, wherein the first uplink symbol comprises a physical uplink shared channel (PUSCH) symbol and the second uplink symbol comprises a sounding reference signal (SRS) symbol.

19. A non-transitory computer-readable storage medium storing one or more programs configured to be executed by at least one processor on an electronic device, the one or more programs including instructions that, when executed by the at least one processor, cause the at least one processor to:
receive a random access response (RAR) from a wireless base station that allocates uplink resources for the electronic device;
transmit wireless data to the wireless base station using the allocated uplink resources, wherein the wireless data identifies a time period;
transmit a first uplink symbol to the wireless base station at a first output power level; and
transmit a second uplink symbol to the wireless base station at a second output power level that is different from the first output power level, wherein the second uplink symbol is separated in time from the first uplink symbol by a series of gap symbols exhibiting a collective duration that is greater than or equal to the time period identified by the wireless data transmitted to the wireless base station, the first uplink symbol comprises a physical uplink control channel (PUCCH) symbol or a physical uplink shared channel (PUSCH) symbol, and the second uplink symbol comprises a sounding reference signal (SRS) symbol.

20. The non-transitory computer readable storage medium of claim 19, wherein the first and second uplink symbols are consecutive symbols transmitted by the electronic device.

\* \* \* \* \*